United States Patent [19]

Yasui et al.

[11] Patent Number: 4,809,639
[45] Date of Patent: Mar. 7, 1989

[54] COATING DEVICE

[75] Inventors: Yoshinari Yasui; Takashi Iwasaki, both of Kanagawa, Japan

[73] Assignee: Yasui Seiki Co. Ltd., Tokyo, Japan

[21] Appl. No.: 885,937

[22] Filed: Jul. 15, 1986

[51] Int. Cl.⁴ .............................................. B05C 3/18
[52] U.S. Cl. ...................................... 118/65; 118/415
[58] Field of Search ........................... 118/415, 65, 67

[56] References Cited

U.S. PATENT DOCUMENTS

| | | | |
|---|---|---|---|
| 2,022,733 | 12/1935 | Parks | 118/415 |
| 2,389,459 | 11/1945 | Remark et al. | 118/67 X |
| 2,710,590 | 6/1955 | Gerard | 118/65 |
| 3,177,790 | 4/1965 | Turner et al. | 118/65 X |
| 3,413,141 | 11/1968 | Friedman | 118/415 X |
| 4,518,634 | 5/1985 | Gini et al. | 118/415 X |

Primary Examiner—John McIntosh

[57] ABSTRACT

A coating device including a supply roller, a coating applicator, a driving roller and a takeup roller all cantilever mounted on a surface of a vertical panel inside a casing. A continuous base member to be coated on one side if sprially guided by guide rolls from the supply roller past the coating applicator, past the driving roller and onto the takeup roller. The base member is contacted by the rollers on the side opposite the coating.

9 Claims, 3 Drawing Sheets

COATING DEVICE

FIELD OF THE INVENTION

The present invention relates to a coating device for coating a paint on a sheet-like member and more particularly a coating device especially adapted for conducting coating tests in order to select kinds of sheet-like base members and coating liquid and the thickness of a coated layer which are best suitable for the production of articles such as magnetic tapes, thermal printer ribbons and the like consisting of a sheet-like continuous plastic-, paper- and cloth-base member coated with a coating liquid.

BACKGROUND OF THE INVENTION

With the coating device for coating a coating liquid on one surface of a continuous base member of the type described above, the coating operation is carried out in an open space so that dust particles contained in the air are mixed with a coating liquid, thus degrading the quality of finished products. In order to overcome such problem as described above, the coating operation may be carried out in an enclosed space, but there arises the problem that the coating operation is adversely affected.

Meanwhile, in the case of the conventional coating tests, a conventional coating device adapted for practical production is used and a coating liquid is coated on a continuous base member by manually shifting the coating device or the continuous base member. Thus when the conventional coating device is used in the coating tests, each test takes a long period of time and consequently test efficiency is low.

BRIEF SUMMARY OF THE INVENTION

In view of the above, a first object of the present invention is to provide a coating device which can accomplish the coating operation efficiently in an enclosed space.

A second object of the present invention is to provide a coating device which can accomplish various coating tests efficiently.

A third object of the present invention is to provide coating means best adapted for use with the coating device of the type described above.

In a coating device in accordance with the present invention, a supply roller upon which is mounted a roll of a continuous base member, coating means, a driving roller for driving a continuous base member, a take-up roller for rewinding a continuous base member and guide rollers for guiding a continuous base member from the supply roller to the take-up roller are all mounted like a cantilever on one surface of a single vertical panel which is surrounded with a casing. Therefore the coating operation can be carried out in an enclosed space defined by the casing and various operations for carrying out the coating operation can be accomplished on the front side of the coating device, resulting in efficient coating tests.

Furthermore, according to the present invention, a coating liquid supply means is mounted on a slide plate over which slides a continuous base member and a coating liquid layer having a predetermined thickness is discharged through a slit formed at the lower end of the coating liquid supply means over a continuous base member. In this manner, the coating liquid can be uniformly coated over the surface of the continuous base member.

DETAILED DESCRIPTION OF THE INVENTION

Figure 1:
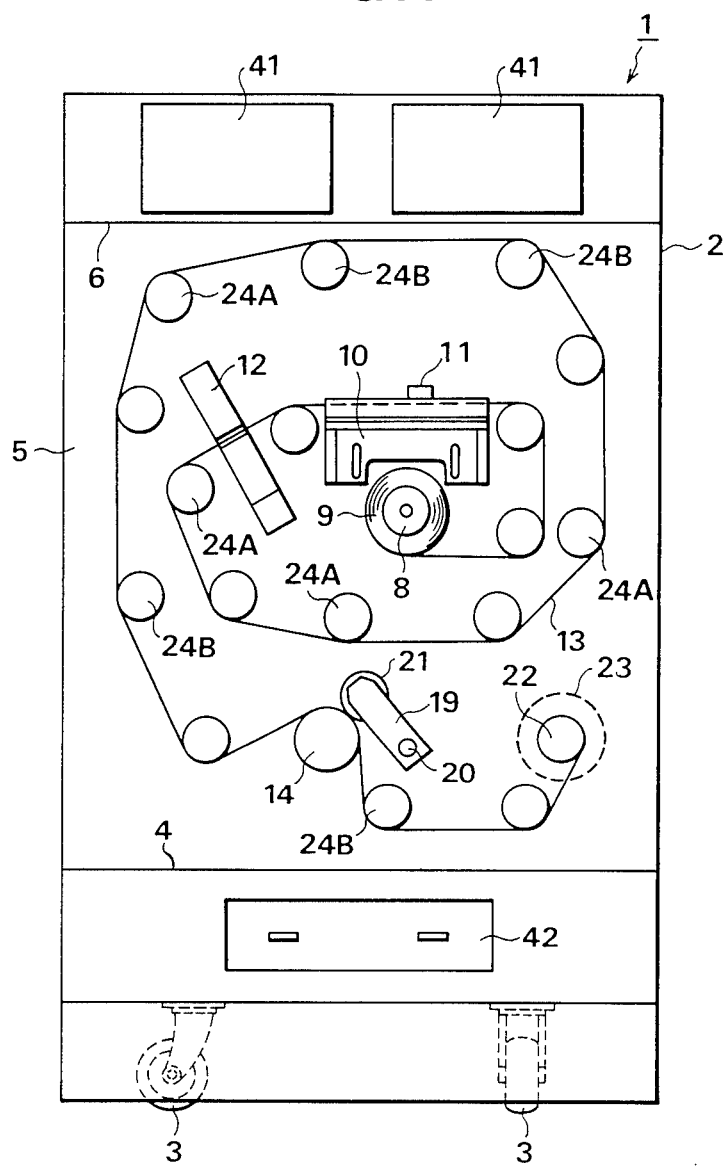
FIG. 1 is a front view of a coating device in accordance with the present invention.
Figure 2:
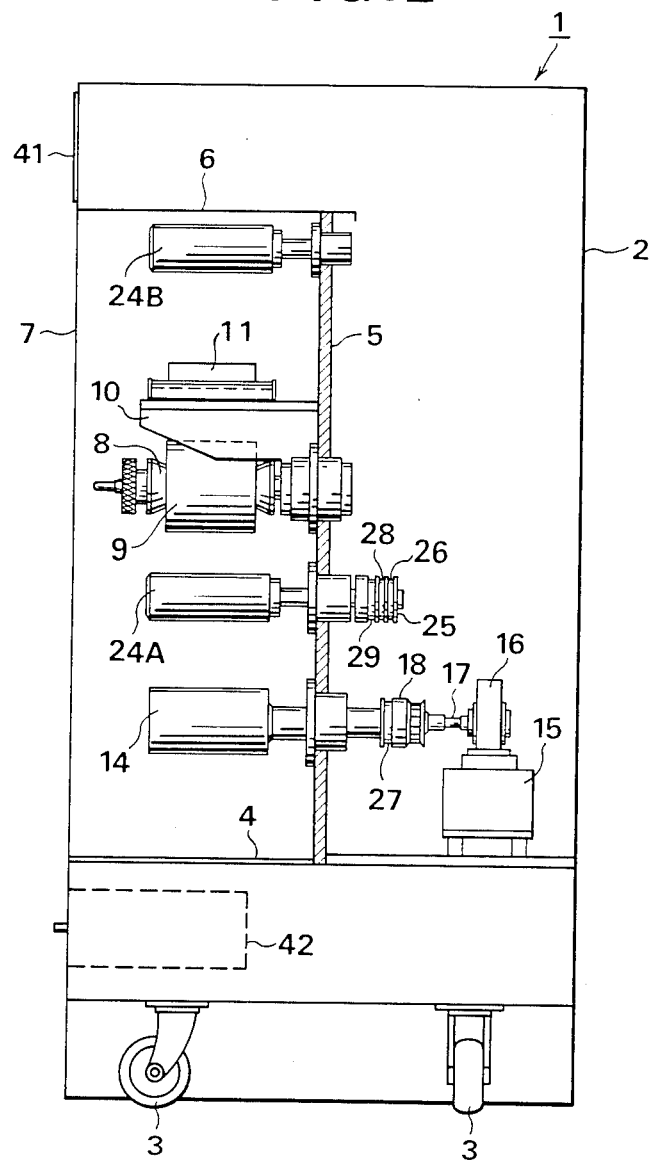
FIG. 2 is a longitudinal side section view thereof.

Referring first to FIGS. 1 and 2, a coating device generally designated by the reference numeral 1 is provided with a box-shaped casing 2 and a plurality of casters 3 are securely fixed to the bottom of the casing 2 so that the casing 2 is movable. A base plate 4 is extended horizontally at the lower portion of the casing 2 and an upright panel 5 is erected on the base plate 4 intermediates the front and rear sides of the casing 2. The upper end of the upright panel 5 is positioned in the vicinity of the top of the casing 2 and is supported by a ceiling plate 6 which in turn is attached to the casing 2 and is extended in the horizontal direction. The width of the upright panel 5 is substantially equal to that of the casing 2 and a door 7 is attached to the front opening of the casing 2 forwardly of the upright panel 5 so as to open the casing 2 to the exterior or to close the casing 2 from the exterior.

A supply roller 8 is supported like a cantilever substantially at the center of the upright panel 5 and a roll of a continuous base member 9 is rotatably mounted on the supply roller 8. A coating stand 10 is supported by the upright panel 5 immediately above the supply roller 8 and is extended forwardly. A coating means 11 to be described in detail hereinafter is mounted on the coating stand 10. An orientation device 12 is supported by the upright panel 5 and extended forwardly from the left side of the coating stand 10 (See FIG. 1). When a magnetic coating liquid is coated on a continuous base member 13 unrolled from the continuous base member roll 9, by a coating means 11, the orientation device 12 serves to improve the orientation of magnetic finely divided particles contained in the coating medium.

A driving roller 14 is supported like a cantilever by the upright panel 5 at a position below the horizontal center line thereof and is drivingly connected to a rotating shaft 17 of a motor 16 securely mounted on a motor stand 15 which in turn is securely mounted on the base plate 4 behind the upright panel 5. Therefore when the motor 16 is energized, the driving roller 14 is rotated. A pulley 18 to be described in detail hereinafter is mounted on the rotating shaft 17 of the motor 16. An arm 19 is pivoted with a pin 20 to the upright panel 5 in the vicinity of the driving roller 14 and carries a driven roller 21 which is in contact with the driving roller 14. The driven roller 21 is normally pressed against the driving roller 14 under the force of a bias spring (not shown). A take-up roller 22 for rewinding the coated continuous base member 13 is supported like a cantilever by the upright panel 5 on the right side of the driving roller 14 and is driven by a motor 23 as in the case of the driving roller 14.

A plurality of guide rollers 24A, 24B and so on are supported like a cantilever by the front surface of the upright panel 5 so as to define the passage of the continuous base member 13 which is unrolled from the continuous base member roll 9, passes through the coating means 11, the orientation device 12 and the driving roller 14 and then is wound by the take-up roller 22. These guide rollers 24A and 24B are so arranged that the continuous base member 13 unrolled from the continuous base member roll 9 is transported around the roll 9 twice along a spiral passage in the counterclockwise direction before it reaches the driving roller 14. The guide rollers 24A are driven positively while the guide rollers 24B are driven when they are made into sliding contact with the continuous base member 13. A suitable number of positive guide rollers 24A are interposed between the passive guide rollers 24B so that even when the distance between the continuous base member roll 9 and the driving roller 14 which unrolls the continuous base member 13 is relatively long, the elongation of the continuous base member 13 can be prevented. More particularly, the positive guide roller 24A most closer to the driving roller 14 carries a pulley 25 behind the upright panel 5 and an endless belt (not shown) is wrapped around the groove 26 of the pulley 25 and the groove 27 of the pulley 18 carried by the rotating shaft 17 of the motor 16 so that the rotation of the motor 16 is transmitted to the positive guide roller 24A. Endless belts (not shown) are wrapped around the grooves 28 and 29 of the positive guide pulley 25 of the positive guide roller 24A and the pulleys carried by the other positive guide rollers 24A so that the latter are positively driven. A plurality of positive and passive guide rollers 24A and 24B are used so that they are made of a aluminum and consequently the coating device 1 is light in weight. The surfaces of the guide rollers 24A and 24B are subjected to the surface treatment so as to form an alumilite layer or are plated with hard chrominum.

Figure 3:
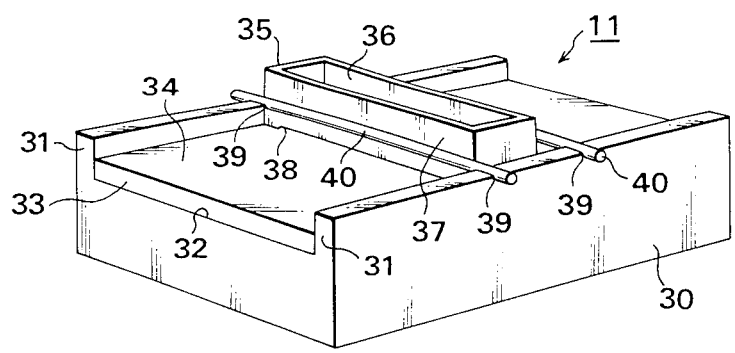
FIG. 3 is a perspective view of a coating means thereof.

Referring next to FIG. 3, the coating means 11 has a base frame 30 mounted on the coating stand 10 and a pair of guide walls 31 are extended upwardly from the lengthwise side walls of the base frame 30 and are spaced apart from each other by a suitable distance in the widthwise direction of the continuous base member 13. A sliding plate 33 having a polished upper surface 34 such as a mirror surface of a sheet of glass is disposed on the upper surface 32 of the base frame 30 between the guide walls 31 and a coating liquid supply means 35 for supplying coating liquid to the sliding plate 33 is mounted on the upper surface 34 of the sliding plate 33. The coating liquid supply means 35 is of a rectangular cross section and has a vertical through hole 36 to define a pool of coating liquid 36 and the lengthwise ends of the coating liquid supply means 35 abut the guide walls 31, respectively. The lower side of the rear wall 37 of the coating liquid supply means 35 which is on the downstream side of the continuous base member 13 transported through the coating means 11, is formed with a slit 38 substantially over the whole length of the hole 36 in the coating medium supply means 35 and the slit 38 and the upper surface 34 of the sliding plate 33 are spaced apart from each other by a predetermined distance. A coating liquid fed into the coating liquid supply means 35 issues through the slit 38.

The upper side of each of the guide walls 31 is formed with a pair of arcuate recesses 39 which are spaced apart from each other by a predetermined distance in the direction in which the continuous base member 13 is transported and a pair of arcuate recesses 39 formed at the upper side of one guide wall 31 are in opposed relationship with a pair of arcuate recesses 39 formed at the upper side of the other guide wall 31. A pair of cylindrical stoppers 40 are extended between the guide walls 31 and fitted into the arcuate recesses 39 of the guide walls 31. The distance between the stoppers 40 is substantially equal to the length of the coating liquid supply means 35 in the direction in which the continuous base member 13 is transported so that the coating liquid supply means 35 is sandwiched between the stoppers 40 and is prevented from being displaced in the direction in which the continuous base member 13 is transported.

Referring back to FIGS. 1 and 2, operation panels 41 are attached to the upper front portion of the casing 2 and a drawer 42 for receiving tools and the like therein is provided at the lower portion of the casing 2.

Next the mode of operation of the coating device with the above-described construction will be described. First, the door 7 of the casing 2 is opened so that the continuous base member roll 9 is mounted on the supply roller 8 and an operator manually unwinds the continuous base member 13 from the roll 9, wraps it around the guide rollers 24A and 24B, passes it through the coating means 11, the orientation device 12 and the driving roller 14 and winds the leading edge of the continuous base member 13 around the take-up roller 22. Prior to the above-described threading operation, the coating liquid supply means 35 of the coating means 11 is removed and the continuous base member 13 is caused to slide over the upper surface 34 of the sliding plate 33. Thereafter, the coating liquid supply means 35 is mounted on the continuous base member 13 on the slide plate 33 and after a predetermined quantity of a coating liquid is fed into the coating liquid supply means 35, the door 7 is closed. Next the motors 16 and 23 are energized so that the driving roller 14 is rotated and consequently the continuous base member 13 clamped between the driving roller 14 and the driven roller 21 is pulled, whereby it is gradually unrolled from the roll 9. When the continuous base member 13 passes over the slide plate 33 of the coating means 11, the coating liquid issues through the slit 38 of the coating liquid supply means 35 over the continuous base member 13 without entraining dust particles in the coated layer. The continuous base member 13 which passed through the coating means 11 is guided by the guide roller 24B so as to enter the orientation device 12. When the magnetic coating liquid is used in the coating means 11, the orientation device 12 improves the orientation of finely divided magnetic particles contained in the coated layer. Thereafter, the continuous base member 13 is guided by the guide rollers 24A and 24B in such a way that the coated layer on the continuous base member 13 is not made in contact with the guide rollers 24A and 24B and is transported around the roll 9 about one and a half turns so that the coated liquid is dried. When the coated continuous base member 13 reaches the driving roller 14, the coated layer on the continuous base member 13 is made into contact with the driving roller 14 for the first time since it has left the coating means 11, but while the continuous base member 13 is transported a long distance between the coating means 11 and the driving roller 14, the coating liquid applied to the continuous base member 13 is already sufficiently dried. Therefore, the degradation of the quality of the coated layer on the continuous base member 13 due to the contact thereof with the driving roller 14 can be avoided. Even though the continuous base member 13 is transported a long distance from the coating means 11 to the driving roller 14, it is positively transported by the positive guide rollers 24A which are rotated by the motor 16 so that there is no possibility that the continuous base member 13 is elongated. The continuous base member 13 which has passed past the driving roller 14 and the driven roller 13 is rewound by the take-up roller 22 which is driven by the motor 23.

When the coating device 1 is used in coating tests, the thickness of the coated layer on the continuous base member 13 can be varied in a simple manner by replacing the coating liquid supply means 35 with another coating liquid supply means having a slit 38 of a different width. In the case of coating tests, it is preferable that the rollers 8, 14, 24A and 24B are small in size. When the coating device 1 is used in a cold northern district, it is preferable to provide as an option a heater for heating the interior of the casing 2, thereby accelerating the drying of the coated layer.

What is claimed is:

1. In a coating device, for applying a liquid coating of preselected thickness directly to one side of a film, of the type in which a continuous film is unrolled by a principal driving roller of said coating device, with said driving roller drawing said film from a film roll mounted on a supply roller of said coating device is drawn through a coating means portion of said coating device, said coating means being of the type in which one surface of the film is coated at a film coating application position within said coating means with said liquid coating and the coated film is thereafter collected on a take-up roller of said coating device only after said coating has been permitted to dry on said film, said coating on said film being uncontacted until said coating is dry and said film having said coating thereon is taken up on said take-up roller, without airborne dust infiltrating between said film and said coating at the position of coating application to said film, said coating means facilitating rapid manual change from one preselected film coating thickness to another, rapid manual change of the coating material being applied to said film and rapid manual change of said film from one material to another, said principal driving roller drawing said film from said supply roller by contacting said coated film at a position, respecting the path of film travel about said coating device proximate said, film take-up roller and sufficiently removed from said coating means along said path of film travel that said coating applied to said film has dried on said film prior to said film reaching said principal driving roller, the improvement in said coating device comprising:

a. a housing with a hinged door;
b. an upright panel is said housing, dividing the interior of the housing into vapor-tightly separated forward and rear parts with said hinged door opening into said forward part, said panel supporting in cantilever fashion in the forward part of the housing said supply roller, said coating means, said principal driving roller and said take-up roller with portions of said supply roller, said coating means, said principal driving roller and said take-up roller oppositely from said cantilever-joining with said panel, proximate said door, being free-standing and uncontacted by other components of said coating device;
c. a plurality of driven guide rollers located in said forward part and supported in cantilever fashion by said upright panel to define a generally spiral film path of the coated film between said coating means and said principal driving roller, said spiral path being centered generally about and originating at said supply roller and generating an angle of rotation about said supply roll exceeding 360 degrees, with said driven guide rollers intermediate said coating means and said principal driving roller being positioned to contact only a side of said film opposite that to which said coating is applied, ends of said respective driven guide roller shafts in said first part of said housing which are remote from positions of roller shaft passage through said panel being free floating, proximate said hinged door when said door is closed and unconnected to other structure of said apparatus;
d. a plurality of idler guide rollers located in said forward part and supported in cantilever fashion by said upright panel, said idler rollers being generally interposed with said drive rollers to define, with said driven guide rollers, said generally spiral film path of the coated film between said coating means and said principal driving roller, with said idler guide rollers intermediate said coating means and said principal driving roller being positioned to contact only a side of said film opposite that to which said coating is applied:
e. a motor in said rear part for rotating said principal driving roller; and
f. means in said rear part for serially drivingly connecting said driven guide rollers to said principal driving roller for indirect driving rotation of said driven guide rollers by said motor in a common direction with said principal driving roller and said take-up roller;
g. said coating means comprising:
  i. a longitudinally extending horizontal plate having a smooth upper surface;
  ii. a pair of longitudinally elongated means including guide walls on either side of said horizontal plate, extending fixedly upwardly from said plate upper surface and being transversely horizontally spaced from one another a width of said film to pass through said apparatus;
  iii. said guide means proximate said longitudinal midpoint of said apparatus having respective arcuate grooves formed therein;
  iv. a coating reservoir of generally rectangular-solid shape and having longitudinal length less than said horizontal plate, being of transverse width to fit slideably removably between said guide walls, resting on said horizontal plate and being manually liftable thereof, said coating reservoir having an open top interior for holding a supply of said coating liquid;
  v. said reservoir having a recess formed in a lower surface of a reservoir wall extending transversely across and facing said plate between said guide walls, said recess being of transverse length less than distance separating said guide walls and having transverse extremities equally spaced from said respective guide walls, said recess defining a surface facing said horizontal plate upper surface, parallel thereto and spaced therefrom, an opening defined by space between said recess surface and said horizontal plate upper surface communicating with said reservoir open interior, distance between said horizontal plate and said recess-defined surface defining said predetermined thickness of coating applied to said film; and vi. cylindrical means for retaining said reservoir between said guide walls as said reservoir is resting on said horizontal plate, sized for drop fitting into said respective arcuate grooves in said horizontal guide walls and being retained by said grooves against longitudinal movement, abuttingly contacting said reservoir exterior and thereby restraining said reservoir from longitudinal movement as said film passes longitudinally along said horizontal plate upper surface area and beneath said reservoir and slidably contacts said reservoir lower surface between respective extremities of said recess-defined surface and respective guide walls and said coating contacts said film at said recess surface and said film slides along said horizontal plate.

2. Apparatus for applying liquid to a single side of film on a supply roll without airborne dust infiltrating between said film and said coating at the position of coating application to said film, facilitating rapid manual change from one preselected thickness coating to another without change of said film, rapid manual change of the coating material being applied without change of said film and rapid manual change of said film from one material to another, comprising:
   a. a housing having an upright panel therein dividing the interior space of the housing into first and second parts which do not communicate with one another;
   b. said supply roll of said film being rotatably mounted on a first horizontal shaft in said first interior portion of said housing:
   c. a film take-up roller rotatably mounted on a second shaft in said first part of said housing, said first and second shafts being parallel.
   d. a first motor for driving said take-up roller, located in said second interior portion of said housing, said second shaft extending through said panel from said first part of said housing into said second part of said housing;
   e. means for connecting said first motor with said second shaft for driving rotation of said second shaft thereby;
   f. a plurality of driven guide rollers mounted on respective shafts disposed parallel with said first and second shafts in said first part of said housing and extending through said panel into said second part of said housing for drivingly guiding said film as said film passes thereover, ends of said respective driven guide roller shafts in said first part of said housing which are remote from positions of roller shaft passage through said panel being free floating and unconnected to other structure of said apparatus;
   g. means in said first part of said housing for applying said liquid to said one side of said film as said film passes a coating station comprising:
      i. a horizontal plate;
      ii. guide means on either side of said horizontal plate, extending fixedly upwardly from said plate and being transversely spaced from one another a width of said film to pass through said apparatus;
      iii. an open top coating reservoir having longitudinal length less than said horizontal plate, of transverse width to contact and fit removably between said guide means, resting on said horizontal plate and being liftable therefrom, having an open interior for holding a supply of said coating liquid, said reservoir walls having planar lower surfaces for contacting said film as said film passes through said coating means in facing contact with said plate;
      iv. one lower reservoir surface having a recess formed therein relative to said horizontal plate, extending transversely across said plate between said guide means in a downstream position respecting said film travel through said coating means, said recess being of transverse length less than distance separating said guide means and having transverse extremities spaced from said respective guide means, said recess defining a planar lower surface of a portion of one of said reservoir walls parallel to said horizontal plate and spaced vertically therefrom, space between said recessed surface and said horizontal plate communicating with said reservoir interior for coating liquid flow from said reservoir interior to contact said film at said recess, distance between said horizontal plate and said recess defining said predetermined thickness of coating applied to said film;
      v. means for retaining said reservoir against longitudinal movement between said guide means along said horizontal plate, detachably connecting to said guide means, contacting said reservoir and thereby restraining said reservoir from longitudinal movement as said film passes longitudinal beneath said reservoir and said coating contacts said film at said recess;
   h. a plurality of idler rollers rotatably mounted an respective shafts which are parallel with said first and second shafts ends of said respective shafts remote from said juncture with said panel being free floating and unconnected to other structure of said apparatus;
   i. said driven guide rollers and said idler guide rollers being interposed and defining an outwardly spiralling path of said film between said coating station and said take-up roller with said driven guide rollers and said idler rollers contacting a surface of said film facing radially inwardly with respect to said spiralling path, oppositely said film surface to which said coating had been applied.
   j. means including a plurality of endless guide belts residing in planes parallel with but each respectively offset from said panel, and each connecting to at least two pulleys on shafts associated with ones of said drive rollers within said second part of said housing, for drivingly connecting said driven guide rollers to a second motor for serial driving rotation of said driven guide rollers in the direction of rotation of said take-up roller and said supply roll of film.

3. Apparatus of claim 2 wherein said outwardly spiralling path spirals in excess of 360 degrees.

4. Apparatus of claim 3 wherein said outwardly spiralling path spirals about 540 degrees.

5. Apparatus of claim 2 wherein said driving means applies driving rotation to said driven guide rollers serially.

6. Apparatus of claim 5 wherein said driving means applies driving rotation to said driven guide rollers serially via a drive belt.

7. Apparatus of claim 6 wherein said drive belt engages pulleys mounted on shafts within said second part of said housing fixedly connected to said shafts on which said driven guide rollers are mounted, said shafts being cantilever mounted on said panel and extending from said panel into said part of said housing where said driven guide rollers are located.

8. Apparatus of claim 7 wherein said housing is generally rectangular includes a door providing external access to said first part of said housing interior and is mounted on casters.

9. Apparatus for rapid performance of coating tests involving applying coating liquid to a single side of moving film on a supply roll, adapted for manual quick change of said supply roll and said film stored thereon, for manual quick change of application thickness of said coating to said film without change of said supply roll and said film material stored thereon and for manual quick change of the coating material being applied without change of said supply roll and said film material stored thereon, comprising:

a. a housing, having an upright panel therein dividing the interior space of the housing into respectively gas tightly isolated first and second parts, said housing including a hinged door which when closed is generally parallel with said upright panel, said door providing access to said first part of said housing interior when said door is open;
   b. said supply roll of said film being rotatably mounted on a first horizontal shaft in said first interior portion of said housing, said first horizontal shaft being generally perpendicular to said panel and cantilevered therefrom, on end of said first shaft remote from said cantilever juncture with said panel being free floating, proximate said hinged door when said door is closed, and unconnected to other structure of said apparatus, said first shaft being perpendicular to said panel and said hinged door when said door is closed;
   c. a film take-up roller rotatably mounted on a second shaft in said first part of said housing, said first and second shafts being parallel, an end of said second shaft remote from said second shaft juncture with said panel being free floating, proximate said hinged door when said door is closed and unconnected to other structure of said apparatus;
   d. a first motor for driving said take-up roller, located in said second interior portion of said housing, said second shaft extending through said panel from said first part of said housing into said second part of said housing;
   e. means in said second part of said housing for connecting said first motor with said second shaft for driving rotation of said second shaft thereby;
   f. a plurality of driven guide rollers mounted on respective shafts parallel with said first and second shafts in said first part of said housing and extending through said panel into said second part of said housing, said driven guide rollers being generally spirally dispersed with respect to said supply roll to define an outwardly spiralling path along with said film is driven by said driven guide rollers over a spiral angle for drivingly guiding said film as said film passes therefrom, ends of said respective driven guide roller shafts in said first part of said housing and remote from positions of roller shaft passage through said panel being free floating, proximate said hinged door when said door is closed and unconnected to other structure of said apparatus;
   g. means in said first part of said housing cantilevered outwardly from said panel for applying said liquid to said one side of said film as said film passes therethrough comprising:
      i. a longitudinally extending horizontal plate having a smooth upper surface;
      ii. a pair of longitudinally elongated guide walls on either side of said horizontal plate, extending upwardly from said plate upper surface, said guide walls being transversely horizontally spaced from one another a distance corresponding to width of said film to pass through said apparatus, vertical extremities of said guide walls proximate the longitudinal midpoint of said apparatus being generally parallel with said upper surface of said horizontal plate;
      iii. said vertical extremities of said guide walls proximate said longitudinal midpoint of said apparatus having respective transverse grooves formed therein, with corresponding grooves in respective guide walls being at the same relative longitudinal positions on said guide walls;
      iv. a coating reservoir of generally rectangular-solid shape and having longitudinal length less than said horizontal plate, being of transverse width to fit slideably and removably between said guide walls, on said horizontal plate, said coating reservoir having an open interior for holding a supply of said coating liquid;
      v. said reservoir having a recess formed in lower surface of a reservoir wall extending transversely across said plate between said guide walls, said recess being of transverse length less than distance separating said guide walls and being equally spaced from said respective guide walls, said recess defining a surface parallel to said horizontal plate upper surface and spaced therefrom, space between said recess surface and said horizontal plate upper surface communicating with said reservoir open interior, distance from said horizontal plate upper surface to said surface defined by said recess defining said predetermined thickness of coating to be applied to said film;
      vi. means for retaining said reservoir between said guide walls and on said horizontal plate, fitting into said respective grooves in said horizontal guide walls and being retained by said grooves against longitudinal movement, contacting said reservoir and thereby restraining said reservoir from longitudinally movement as said film passes longitudinally beneath said reservoir and said coating contacts said film at said recess surface;
   h. a plurality of idler guide rollers rotatably mounted on respective shafts which are parallel with said first and second shafts said idler roller shafts being generally perpendicular to said panel and cantilevered therefrom, ends of said idler roller shafts remote from said cantilever juncture with said panel being free floating, proximate said hinged door with said door is closed and unconnected to other structure of said apparatus;
   i. said guide rollers defining an outwardly spiralling path of said film of at least about 720 degrees between said supply roll and said take-up roller and at least about 540 degrees between such coating station and said take-up roll with said driven guide rollers and said idler guide rollers contacting a surface of said film facing radially inwardly with respect to said spiralling path, oppositely said film surface to which said coating is applied with said driven guide rollers urging said film along said at least about 540 degree portion of said spiralling path between said coating station and said take-up roller towards said take-up roller;

j. a second motor for directly driving one of said driven guide rollers, said directly driven guide roller being designated a drive roller, said second motor being located in said second interior portion of said housing and being connected within said second interior position of said housing to a shaft associated with said drive roller extending through said panel from said first part of said housing into said second part of said housing;

k. means including a drive belt and pulleys mounted on said shafts to which said driven guide rollers are mounted within said second part of said housing, for serially drivingly connecting said driven guide rollers to said drive roller and hence to said second motor for serial driving rotation of said driven guide rollers by said second motor in the direction of rotation of said take-up roller.

* * * * *